United States Patent [19]

(12) United States Patent
Yoshikawa et al.

(10) Patent No.: US 11,153,920 B2
(45) Date of Patent: Oct. 19, 2021

(54) ESTABLISHING A GTP SESSION

(71) Applicant: HEWLETT PACKARD ENTERPRISE DEVELOPMENT LP, Houston, TX (US)

(72) Inventors: Shinji Yoshikawa, Tokyo (JP); Younggil Yun, Tokyo (JP)

(73) Assignee: Hewlett Packard Enterprise Development LP, Houston, TX (US)

( * ) Notice: Subject to any disclaimer, the term of this patent is extended or adjusted under 35 U.S.C. 154(b) by 110 days.

(21) Appl. No.: 15/843,939

(22) Filed: Dec. 15, 2017

(65) Prior Publication Data

US 2019/0191471 A1   Jun. 20, 2019

(51) Int. Cl.
*H04W 76/12* (2018.01)
*H04W 76/22* (2018.01)
*H04W 76/32* (2018.01)
*H04W 92/04* (2009.01)
*H04W 92/14* (2009.01)
*H04W 92/24* (2009.01)

(52) U.S. Cl.
CPC .......... *H04W 76/12* (2018.02); *H04W 76/22* (2018.02); *H04W 76/32* (2018.02); *H04W 92/045* (2013.01); *H04W 92/14* (2013.01); *H04W 92/24* (2013.01)

(58) Field of Classification Search
CPC ..... H04W 76/12; H04W 76/22; H04W 76/32; H04W 92/045; H04W 92/14; H04W 92/24
See application file for complete search history.

(56) References Cited

U.S. PATENT DOCUMENTS

| | | |
|---|---|---|
| 2,542,012 A | 2/1951 | De et al. |
| 6,233,458 B1 | 5/2001 | Haumont et al. |
| 7,724,688 B2 | 5/2010 | Yamada et al. |
| 8,787,154 B1 | 7/2014 | Medved et al. |
| 8,861,547 B2 | 10/2014 | Gao et al. |
| 9,083,587 B2 | 7/2015 | Babu et al. |
| 9,450,817 B1 | 9/2016 | Bahadur et al. |
| 9,577,845 B2 | 2/2017 | Thakkar et al. |
| 9,648,542 B2 | 5/2017 | Hsu et al. |

(Continued)

FOREIGN PATENT DOCUMENTS

| | | |
|---|---|---|
| EP | 2542012 A1 | 1/2013 |
| EP | 3407645 A1 | 11/2018 |
| WO | 20171126884 A1 | 7/2017 |

OTHER PUBLICATIONS

Bart Barton, "LTE and Beyond: PGW and SGW Selection Procedures in LTE," Mar. 14, 2013, pp. 1-2 [online], Retrieved from the Internet on Oct. 9, 2017 at URL: <http://www.lteandbeyond.com/2013/03/pgw-and-sgw-selection-procedures-in-lte.html>.

(Continued)

*Primary Examiner* — Khaled M Kassim
(74) *Attorney, Agent, or Firm* — Sheppard Mullin Richter & Hampton

(57) ABSTRACT

Examples provided herein establish a GTP session between a base station and a gateway. A session establishing request is received in response to an attach request from a wireless terminal to the base station, and a gateway located within an edge site is selected based on the session establishing request. The session establishing request is edited to include information designating the gateway and transmitted to the gateway.

21 Claims, 11 Drawing Sheets

(56) References Cited

U.S. PATENT DOCUMENTS

| | | |
|---|---|---|
| 9,763,078 B1 | 9/2017 | Zheng et al. |
| 2005/0249194 A1 | 11/2005 | Sahaya et al. |
| 2006/0046728 A1 | 3/2006 | Jung et al. |
| 2006/0140149 A1 | 6/2006 | Kim et al. |
| 2007/0104205 A1 | 5/2007 | Baik |
| 2007/0213060 A1 | 9/2007 | Shaheen |
| 2007/0243821 A1 | 10/2007 | Hundscheidt et al. |
| 2007/0248064 A1 | 10/2007 | Shaheen |
| 2009/0047947 A1 | 2/2009 | Giaretta et al. |
| 2011/0075675 A1 | 3/2011 | Koodli et al. |
| 2011/0090852 A1 | 4/2011 | Ramle et al. |
| 2011/0090911 A1 | 4/2011 | Hao et al. |
| 2011/0310868 A1 | 12/2011 | Yang et al. |
| 2012/0063300 A1 | 3/2012 | Sahin et al. |
| 2012/0173661 A1 | 7/2012 | Mahaffey et al. |
| 2012/0269167 A1 | 10/2012 | Velev et al. |
| 2012/0275430 A1 | 11/2012 | Wang et al. |
| 2013/0121298 A1* | 5/2013 | Rune ............... H04W 72/085 370/329 |
| 2013/0138823 A1 | 5/2013 | Centemeri et al. |
| 2013/0195012 A1 | 8/2013 | Laitila et al. |
| 2013/0272131 A1 | 10/2013 | Takano et al. |
| 2013/0272247 A1 | 10/2013 | Guo |
| 2013/0279345 A1 | 10/2013 | Tamura |
| 2014/0016614 A1* | 1/2014 | Velev ............... H04W 4/70 370/331 |
| 2014/0056290 A1 | 2/2014 | Pazhyannur et al. |
| 2014/0078986 A1 | 3/2014 | Kaippallimalil et al. |
| 2014/0194111 A1 | 7/2014 | Aso et al. |
| 2014/0328246 A1* | 11/2014 | Xu ............... H04W 36/08 370/315 |
| 2015/0049610 A1* | 2/2015 | Kim ............... H04W 4/70 370/233 |
| 2015/0117454 A1 | 4/2015 | Koponen et al. |
| 2015/0146513 A1 | 5/2015 | Zakrzewski |
| 2015/0188770 A1 | 7/2015 | Naiksatam et al. |
| 2015/0208281 A1* | 7/2015 | Kim ............... H04W 8/082 370/235 |
| 2015/0223190 A1 | 8/2015 | Backman |
| 2015/0245249 A1 | 8/2015 | Grootwassink et al. |
| 2015/0256349 A1* | 9/2015 | Kim ............... H04L 12/1407 370/259 |
| 2016/0173334 A1 | 6/2016 | Gavrilovic et al. |
| 2016/0234681 A1 | 8/2016 | Swissa et al. |
| 2016/0277211 A1 | 9/2016 | Kumar et al. |
| 2017/0126618 A1* | 5/2017 | Bhaskaran ............ H04L 61/2007 |
| 2017/0142613 A1 | 5/2017 | Singh et al. |
| 2017/0149667 A1 | 5/2017 | Dahod et al. |
| 2017/0171068 A1 | 6/2017 | Morper et al. |
| 2017/0199751 A1 | 7/2017 | Sama et al. |
| 2017/0245316 A1 | 8/2017 | Salkintzis |
| 2017/0325055 A1* | 11/2017 | Enomoto ............... H04W 80/04 |
| 2018/0103502 A1* | 4/2018 | Kawasaki ............... H04W 4/00 |
| 2018/0132099 A1 | 5/2018 | Li |
| 2018/0338265 A1 | 11/2018 | Goel et al. |
| 2019/0007984 A1* | 1/2019 | Kuroda ............... H04W 88/16 |
| 2019/0045422 A1* | 2/2019 | Shimojou ............... H04W 48/18 |
| 2019/0110324 A1 | 4/2019 | Xu et al. |
| 2019/0116118 A1 | 4/2019 | Kapela |
| 2019/0116624 A1 | 4/2019 | Tandon et al. |
| 2019/0124046 A1 | 4/2019 | Mehra |
| 2019/0190826 A1 | 6/2019 | Yoshikawa et al. |
| 2019/0191471 A1 | 6/2019 | Yoshikawa et al. |

OTHER PUBLICATIONS

Cisco Technology, Inc., "Configuring GPRS Tunneling Protocol Support," Jul. 31, 2011, pp. 1-12.

Cisco, "CLI Book 2. Cisco ASA Series Firewall CLI Configuration Guide, 9.7," Sep. 11, 2017, pp. 1-44 [online], Retrieved from the Internet on Oct. 9, 2017 at URL: <https://www.cisco.com/c/en/us/td/docs/security/asa/asa97/configuration/firewall/asa-97- firewall-config/inspect-mobile.htm>.

Erik Brands, "Flow-Based Monitoring of GTP Traffic in Cellular Networks," Master of Science Thesis, Jul. 20, 2012, pp. 1-64, University of Twente, Enschede, The Netherlands.

Sunny Kumar Lohani, "Performance of SDN-based LTE EPC Gateways," Oct. 2015, pp. 1-28, Department of Computer Science and Engineering, Indian Institute of Technology, Bombay, Mumbai, India.

* cited by examiner

MEC table

| Individual APN | eNodeB | Edge Site |
|---|---|---|
| car.apn | eNodeB-1 | Edge Site1 |
| car.apn | eNodeB-2 | Edge Site1 |
| car.apn | eNodeB-3 | Edge Site2 |
| car.apn | eNodeB-4 | Edge Site2 |
| car.apn | eNodeB-5 | Edge Site2 |
| car.apn | eNodeB-6 | Edge Site2 |
| drone.apn | eNodeB-1 | Edge Site1 |
| drone.apn | eNodeB-2 | Edge Site2 |
| drone.apn | eNodeB-3 | Edge Site3 |
| drone.apn | eNodeB-4 | Edge Site4 |

Fig. 5B

IMSI table

| IMSI | Individual APN |
|---|---|
| 440207139204928 | drone.apn |
| 440207139204929 | car.apn |
| 440207139204930 | xxx.apn |
| 440207139204931 | yyy.apn |

Fig. 5A

ESTABLISHING A GTP SESSION

BACKGROUND

In Multi-Access Edge Computing (MEC) environments, a wireless terminal may be connected to an edge site through a base station of a wireless communication network, such as a Long-Term Evolution (LTE) network. The LTE network may include a wireless network, such as an Evolved Universal Terrestrial Radio Network (eUTRAN) and a core network. The eUTRAN may be provided with one or more base stations called eNodeB, and the core network may be provided with a Mobility Management Entity (MME), and a Serving and Packet data network Gateway (indicated as S/PGW). An S/PGW is a device integrates the functionalities of a Serving Gateway (SGW) and a Packet data network Gateway (PGW). The core network may include a plurality of MMEs and S/PGWs.

The MME is a mechanism for controlling a Control Plane (C-Plane) of network management. It is a network management device and connected to a base station (e.g., eNodeB) through an interface called S1-MME. The MME is connected to a Home Subscriber Server (HSS) through an interface called S6a. The S/PGW is a gateway disposed in the core network, of which the SGW handles C-Plane signals, i.e., control signals, and User Plane (U-Plane) data, i.e., user data. The SGW functionality of the S/PGW is connected to the base station through an interface called S1-U, and connected to the MME through an interface called S11. The PGW functionality of the S/PGW operates as a gateway for connecting the wireless terminal to a Packet Data Network (PDN), which may be an external network such as the Internet. The PGW may be connected to the SGW through interfaces called S5/S8-C and S5/S8-U, which handle the C-Plane and the U-plane, respectively.

BRIEF DESCRIPTION OF THE DRAWINGS

FIG. 5A shows an example table defining a relationship of correspondence between IMSIs and individual APNs.

FIG. 5B shows an example table defining a relationship of correspondence between individual APNs, base stations, and edge sites.

DETAILED DESCRIPTION

Figure 1:
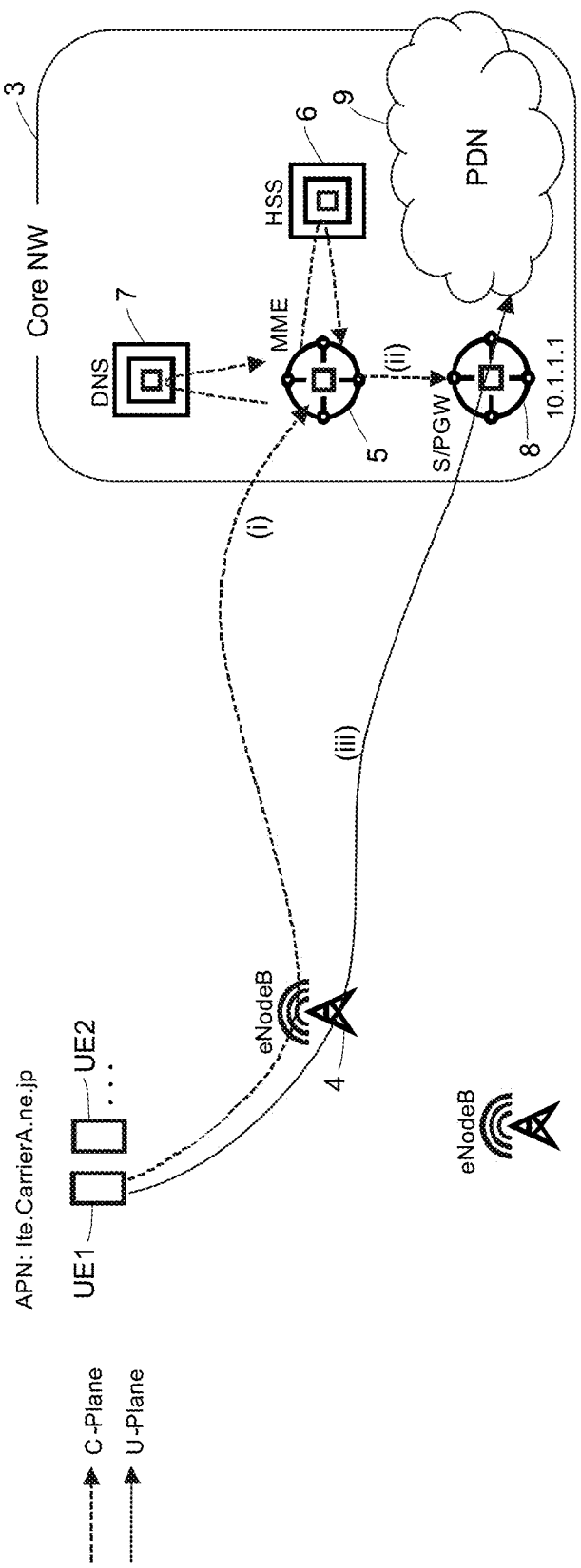
FIG. 1 is an example schematic block diagram showing an LTE network.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more. The term "another," as used herein, is defined as at least a second or more. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. As used herein, the term "device" means a machine, mechanism, manufacture, and/or collection thereof.

In an LTE network configuration shown in FIG. 1, one or more wireless terminals, such as User Equipment (UE) UE1, UE2, etc. may be located within a cell supported by a base station (e.g., eNodeB). To connect to a PDN 9 through a core network 3, for example, UE1 may perform an attachment procedure to the core network 3 through the eNodeB, which may be an eNodeB 4, by the issuance of an attach request from the wireless terminal UE1. The attach request may be delivered to an MME 5 through the eNodeB 4 (see (i) in FIG. 1), and the MME 5 may communicate with an HSS 6 in response to the attach request to perform such actions as registering the location of the UE-1 and authenticating the UE1.

The MME 5 may query a DNS 7 using an Access Point Name (APN) associated with the UE1 and included in the attach request as a key, so as to acquire a list of candidates for a PGW in connection with which the establishment of a communication session between the UE1 and the PDN 9 is to be requested. The MME 5 may also query the DNS 7 using the location information (Tracking Area (TA)) of the UE1 as a key, so as to acquire a list of candidates for an SGW in connection with which the establishment of the session is to be requested.

The MME 5 may search for the same name (domain name) between the list of PGW candidates and the list of PGW candidates, i.e., an integrated SGW and PGW (S/PGW) 8, and selects that name preferentially. The name may be once again searched for in the DNS 7 so that the MME 5 can acquire an Internet Protocol (IP) address of the S/PGW 8. The MME 5 may generate a session establishing request, which is a request for establishing a network session. In the example LTE network, the session establishing request is a General Packet Radio Service (GPRS) Tunneling Protocol (GTP) message representing a Create Session Request for requesting the S/PGW 8 to establish a U-Plane session. The IP address of the S/PGW 8 may be set in the destination IP address of the Request, and the Request may be sent to the S/PGW (see (ii) in FIG. 1).

In response to the Request, the S/PGW 8 may return to the MME 5 a Create Session Response, in which the IP address of S11 interface with the S/PGW may be set in the Fully Qualified Tunnel End Point Identifier (F-TEID) field. In response to the completion of communication in the C-Plane, a GTP-U session connecting the eNodeB 4 and the S/PGW 8 may be established, and the UE1 may communicate with the PDN 9 through the established GTP-U session (see (iii) in FIG. 1).

According to the MEC technology, information processing may be performed in the vicinity of base stations or other communication processing devices that are closer to user terminals. The MEC technology implemented in connection with a mobile network enables mobile equipment to communicate directly with nearby servers, called edge servers, without going through the core network. Such direct communication enables to decrease communication latency.

One possible way of accomplishing MEC in a mobile network environment is to dedicate a device to each base station. This approach requires a large number of such devices and significant costs and/or labors for the installation and maintenance of such devices. Special measures may be taken for assuring that a fault or the like of such device does not influence existing subscribers. Further, as mobile terminals move geographically, additional resources are used to deal with issues relating to the handling of handover of devices between the base stations, such as how to switch a connected edge server from one to another.

As such, examples as provided herein, implement MEC in a mobile network without affecting existing subscribers. Additionally, the examples implement MEC within the mobile network to handle the handover issues previously mentioned.

As used herein, "MEC terminal" refers to a wireless terminal that connects to an edge server for utilizing services or applications within the edge server. The term "non-MEC terminal" refers to other wireless terminals, such as a mobile device (e.g., subscriber) for communicating through an S/PGW in the core network.

Figure 2:
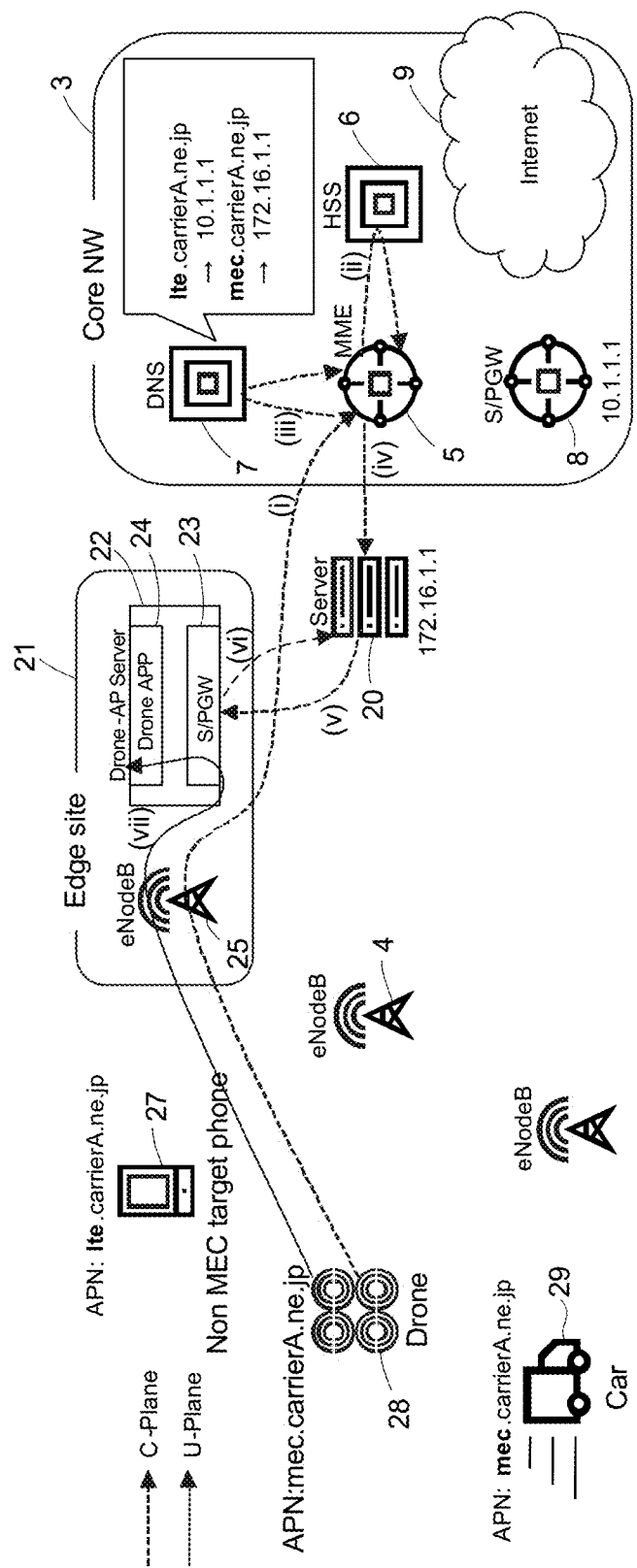
FIG. 2 is an example diagram describing a communication procedure according to one embodiment of the present disclosure.

FIG. 2 is a diagram for describing an example communication procedure performed in an LTE network provided with an edge site 21 and a server 20 installed with a message transfer and control module according to one embodiment of the present disclosure, so as to implement MEC in a mobile network environment. The edge site 21 may be provided with an S/PGW 23 operable to exchange GTP messages with the message transfer and control module and to exchange, after a GTP session has been established, U-plane signals with an eNodeB 25, as well as applications that provide services to any mobile devices, such as automobiles or drones carrying wireless terminals. The S/PGW 23 and the applications may be carried in the same edge server or operated on different edge servers. FIG. 2 shows an edge server 22 carrying both the S/PGW 23 and an application 24 that provides services to drones (Drone APP). It will be also understood that FIG. 2 shows only one edge site among a plurality of edge sites which may be located geographically distributed from each other.

MEC terminals may be set to have associated APNs different from those of non-MEC terminals, and a common APN may be associated with MEC terminals regardless whether the terminals are carried by automobiles or drones. In FIG. 2, a non-MEC terminal 27 may be associated with an APN "lte.carrierA.ne.jp" and a MEC terminal 28 carried on a drone (herein referred to as "drone terminal") may be associated with an APN "mec.carrierA.ne.jp." The APN "mec.carrierA.ne.jp" can be an APN common to MEC terminals for the same communication carrier, such as a terminal carried by a car 29.

Figure 3:
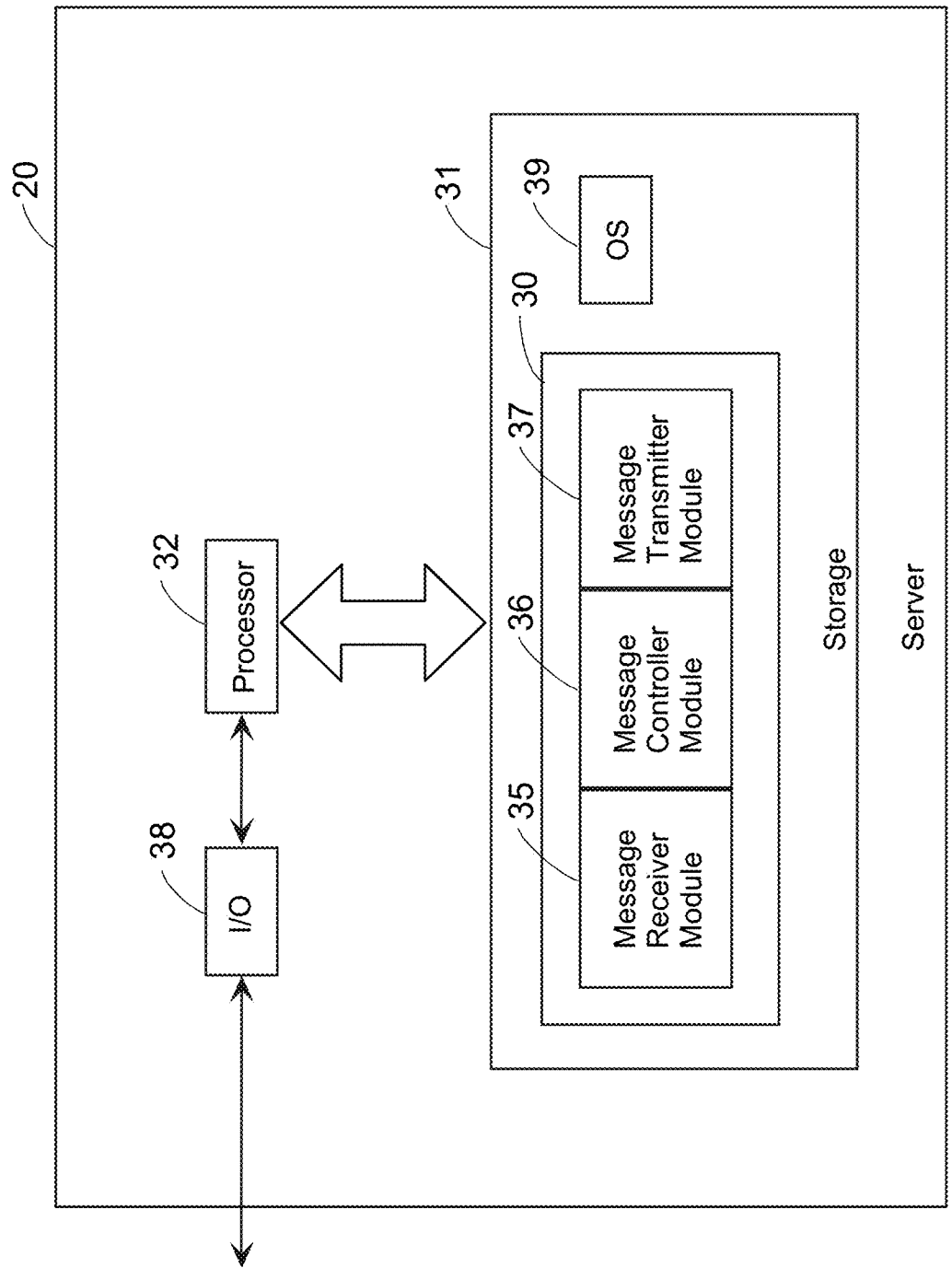
FIG. 3 is an example functional block diagram of a General Packet Radio Service (GPRS) Tunneling Protocol (GTP) message transfer and control device installed in a server according to one embodiment of the present disclosure.

FIG. 3 shows an example functional block diagram of a GTP message transfer and control device according to one embodiment of the present disclosure. The GTP message transfer and control device may be hardware, instructions executable by a processor, and/or combination thereof to provide such functionality. For example, the GTP message transfer and control device may include an integrated circuit, semiconductor, memory module, central processing unit (CPU), processing resource, application-specific integrated circuit (ASIC), processor, chipset, virtualized component or other type of management component capable of managing the GTP message. In one example, the GTP message transfer and control device includes a module 30 installed in a storage 31 on the server 20 of FIG. 2. The server 1 includes a communication interface module I/O 38 and a processor 32 directed by an operating system 39 to execute instructions stored in the GTP message transfer and control module 30, including a message receiver module 35 for providing instructions to receive GTP messages, a message controller module 36 for providing instructions to select a transfer destination for a received message, and a message transmitter module 37 for providing instructions to transmit GTP messages carried in IP packets. Each module may include, by way of example, instructions (e.g., stored on a machine-readable medium) that, when executed (e.g., by controller and/or processor), implements the functionality of the module. Alternatively, or in addition, each module may include electronic circuitry (i.e., hardware) that implements the corresponding functionality. The message transfer and control module 30 may also be provided with an International Mobile Subscriber Identity (IMSI) table, a MEC table, a session information retainer for retaining session information of a GTP session, and a message editor for editing GTP messages.

In one embodiment, the storage 31 may be a machine-readable storage, such as a Random Access Memory (RAM), an Electrically-Erasable Programmable Read-Only Memory (EEPROM) or the like that stores instructions executable by a processor for implementing the functions of the GTP message transfer and control module 30.

According to one embodiment of the GTP message transfer and control module 30, among IP packets carrying GTP messages and transmitted from the S/PGW 23 in the edge site or from the MME 5 shown in FIG. 2, the GTP message transfer and control module 30 may receive IP packets whose destination IP address matches the IP address of the server 20 and, in response, may transport the IP packets after changing the source address to the IP address of the server 20 and the destination address to an IP address determined in accordance with a logic in the GTP message transfer and control module 30. The GTP message transfer and control module 30 may rewrite, with a message editor in the storage 31, the F-TEID field of initial messages such as a Create Session Request and a Create Session Response may relay C-Plane messages between the S/PGW 23 and the MME 5, regardless whether before, during or after the establishment of a GTP session. The message transfer and control module 30 may be provided with a session information retainer module in the storage 31 for retaining session information of GTP sessions.

According to one embodiment, the GTP message transfer and control module 30 may be configured and disposed to receive Ethernet frames from a first L3 switch located immediately prior to, i.e., at a previous hop from the GTP message transfer and control module 30 for routing IP packets transported from the MME 5 or to receive Ethernet frames from a second L3 switch located at a previous hop from the GTP message transfer and control module 30 for routing IP packets transported from the S/PGW 23. The first and second L3 switches may be configured to transport received IP packets to the server 20 in response to the matching of the IP address of the IP packets with an IP address included in the network involving the IP address of the S/PGW 23 or an IP address included in the network involving the IP address of the MME 5.

Figure 4:
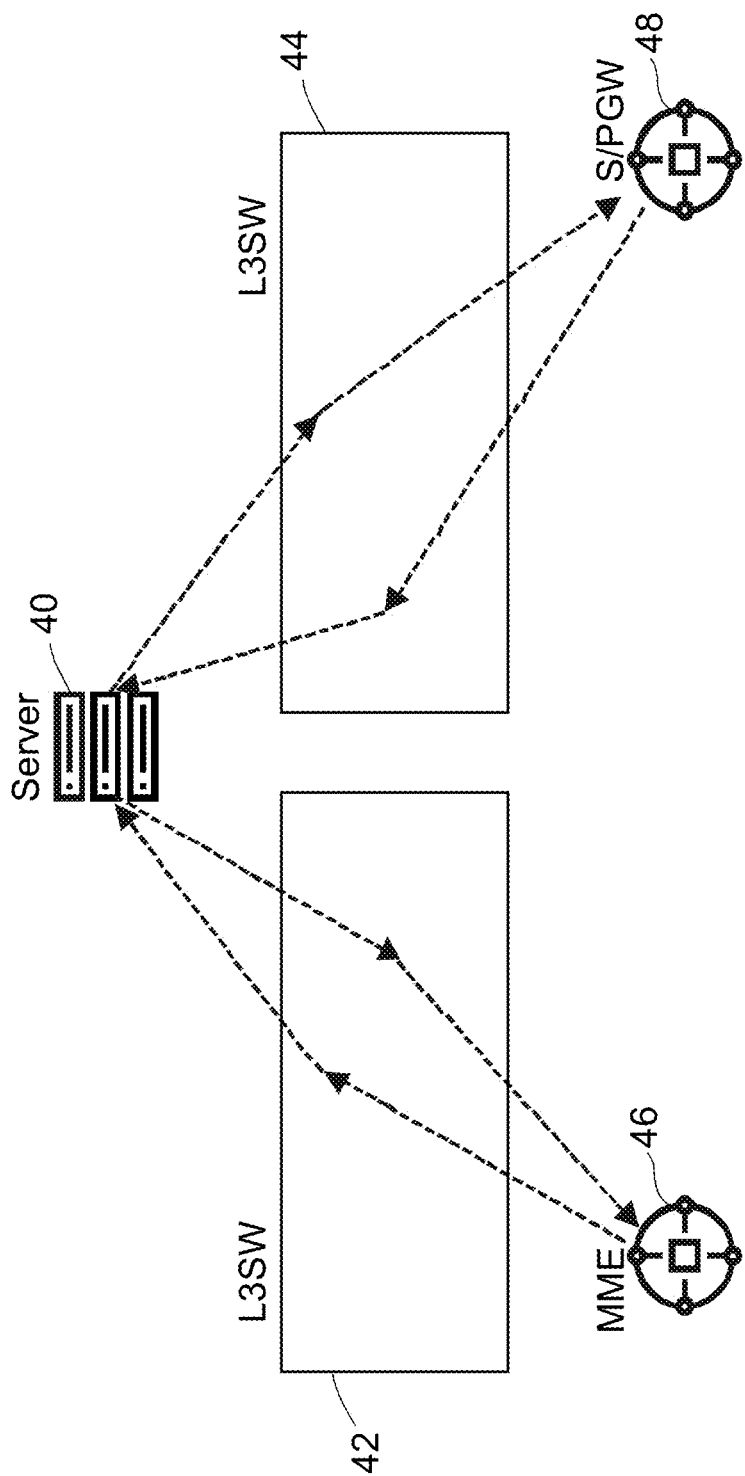
FIG. 4 is an example diagram illustrating transporting of Ethernet frames Layer 3 (L3) switches.

This embodiment of the GTP message transfer and control module 30 may not use a session information retainer module to retain session information for transporting response or processing handover. FIG. 4 illustrates transporting of Ethernet frames among a server 40 provided with the GTP message transport module 30 according to one embodiment of the present disclosure, an MME 46, which may be located in a core network, an S/PGW 48, which may be located in an edge site, a first Layer 3 (L3) switch (L3SW) 42 and a second Layer 3 (L3) switch (L3SW) 44.

The first L3 switch 42 may be used for routing IP packets carrying GTP messages between the server 40 and the MME 46, and the second L3 switch 44 may be used for routing IP packets carrying GTP messages between the server 40 and the S/PGW 48, and the switches 42 and 44 may be provided in the same segment as the server. In other words, among other L3 switches disposed for routing IP packets to the server 40, the first L3 switch 42 and the second L3 switch 44 may be such L3 switches that are located at the last stage or at the previous hop from the server 40. Thus, the L3 switches are located at the first stage or at the next hop from the server 40 for routing IP packets from the server 40. The first L3 switch 42 and the second L3 switch 44 may be any L3 switches usually deployed in networks such as the network illustrated in FIG. 2, as far as they can perform routing as described below. Alternatively, they may be a single L3 switch having the same function as the combination of the two L3 switches 42 and 44.

The first L3 switch 42 and the second L3 switch 44 may be provided with the following routing information, i.e., they may be configured in such a manner that, in response to receiving an IP packet and the destination IP address of the IP packet matching a group of specific destination IP addresses, the L3 switch(es) route one or more IP packets containing the data included in the received IP packet to the server 40. As an example, the first L3 switch 42 may include the IP address of the S/PGW 23 in the edge site 21 shown in FIG. 2, and the second L3 switch 44 may include the IP address of the MME 5 in the core network 3.

The GTP message transfer and control module 30 of the server 40 may thus receive one or more Ethernet frames containing one or more IP packets transported from the MME 5 or the S/PGW 23 and routed through the first or second L3 switch 42 or 44. In response to the destination Media Access Control (MAC) address of the received Ethernet frames matching the MAC address of the server 40 and the IP packets carrying a GTP message, the GTP message transfer and control module 30 may rewrite IP packets for carrying the same GTP message as the received GTP message, and sends out Ethernet frames containing the IP packets.

Referring again to FIG. 3, the message receiver module 35 may receive from the first or second L3 switch 42 or 44 Ethernet frames containing IP packets carrying a GTP message. The receiver module 35 determines whether or not the MAC address of the received Ethernet frames matches the MAC address of the server 40. If a match is found, the receiver module 35 passes the Ethernet frames to the message controller module 36. The message controller module 36 in turn passes the GTP message received from the message receiver module 35 to the message transmitter module 37. The receiver module 35, the message controller module 36 and the message transmitter module 37 may each be hardware, instructions executable by a processor, and/or combination thereof to provide such functionality.

The message transmitter module 37 may create IP packets for carrying the GTP message received from the message controller module 36. The IP address of the received IP packets may be set as the source address of the created IP packets. If the GTP message is not a Create Session Request, the destination address of the created IP packets may be made the same as the destination IP address of the received IP packets. The message transmitter module 37 may thereafter transmit Ethernet frames containing the IP packets and having the MAC address of the first L3 switch 42 as the destination MAC address if the destination IP address is one of the IP address group involving the MME 5. If the destination IP address is one of the IP address group involving the S/PGW 23, the MAC address of the second L3 switch 44 may be used as the destination MAC address of the Ethernet frames.

The message controller module 36 receives IP packets carrying a Modify Bearer Request including identification information on a destination eNodeB from the MME 5. The message controller module 36 learns from the destination IP address of the IP packets which S/PGW is currently establishing a GTP session with the source eNodeB. The message controller module 36 learns from the IP address in the F-TEID field: S1-U eNodeB GTP-U prescribed in Bearer Context IE in the Modify Bearer Request to which eNodeB the MEC terminal is going to move.

The GTP message transfer and control module 30 may be installed in the server 20 or 40. The functions of the message receiver module 35, the message controller module 36 and the message transmitter module 37 may be performed by the processor 32 executing instructions stored in the modules. The functions of the GTP message transfer and control module 30 may be implemented by any combinations of hardware, software and/or firmware. For example, a dedicated GTP message transfer and control apparatus may be provided, comprising a receiver, a controller and a transmitter. In this example, the dedicated GTP message apparatus performs the functions corresponding to modules 35, 36 and 37. In another example, modules 35, 36, and 37 are instructions executed by the processor 32 in cooperation with the I/O module 38. The server may be imparted with a unique IP address.

Turning now to FIG. 5, an example IMSI table 50 and an example MEC table 52 which may be provided in the server are shown. As shown in FIG. 5A, the IMSI table 50 may define a relationship of correspondence between International Mobile Subscriber Identities (IMSIs), identifying wireless terminals, and individual APNs. In other words, the IMSI table 50 may specify which IMSI corresponds to which individual APN. The MEC table 52 shown in FIG. 5B may define a relationship of correspondence between individual APNs, base stations (eNodeBs) and edge sites, i.e., it may specify which base station, and which edge site, corresponds to which individual APN. Each individual APN may identify an application program which is executable on the edge server and is associated with each respective MEC terminal for such purposes as providing services to the MEC terminal. The individual APN may be appropriately set commonly to MEC terminals by an operator of the server.

The message transfer and control module 30 of the server 20 may be configured to derive an IMSI from a Create Session Request sent from an MME, such as the MME 5 shown in FIG. 2, in response to an Attach Request from a MEC terminal. The IMSI table 50 may be referred to for retrieving an individual APN associated with the IMSI. The message transfer and control module 30 may refer to the MEC table 52 for retrieving an edge site corresponding to the combination of the retrieved individual APN and an eNodeB covering the area where the MEC terminal having the IMSI is located. The retrieved edge site may be an edge site including an S/PGW to which the MEC terminal is to be connected. Other than the individual APN, a Mobile Subscriber ISDN Number (MSISDN) and/or an International Mobile Equipment Identity (IMEI) may be used as an information element associated with the individual APN.

A DNS, such as the DNS 7 in the core network 3 shown in FIG. 2, may be configured to return, in response to a query from the MME 5 using a Tracking Area (TA) as a key, a candidate list of SGWs corresponding to the TA, and to return, in response to a query from the MME 5 using an APN as a key, a candidate list of PGWs corresponding to the APN. In one embodiment of the present disclosure, a domain name of the server 20, which can be mecgw.epc.mnc123.mnc456.3gppnetwork.org herein, may be prepared and registered in the DNS 7 for implementing MEC, but the domain name may be registered to associate not with a particular TA but with a plurality or all of TAs, and may also be made to have a lowest weight such that the selection of non-MEC terminals can be prioritized. The list of candidate SGWs returned from the DNS in response to a query using any of such plurality or all of TAs as a key can always include the domain name of the server 20, in addition to the domain names of SGWs associated with the TA. The DNS may be set to always return the domain name of the server 20 in response to a query using the APN of MEC terminals, mec.carrierA.ne.jp, as a key.

Figure 6:
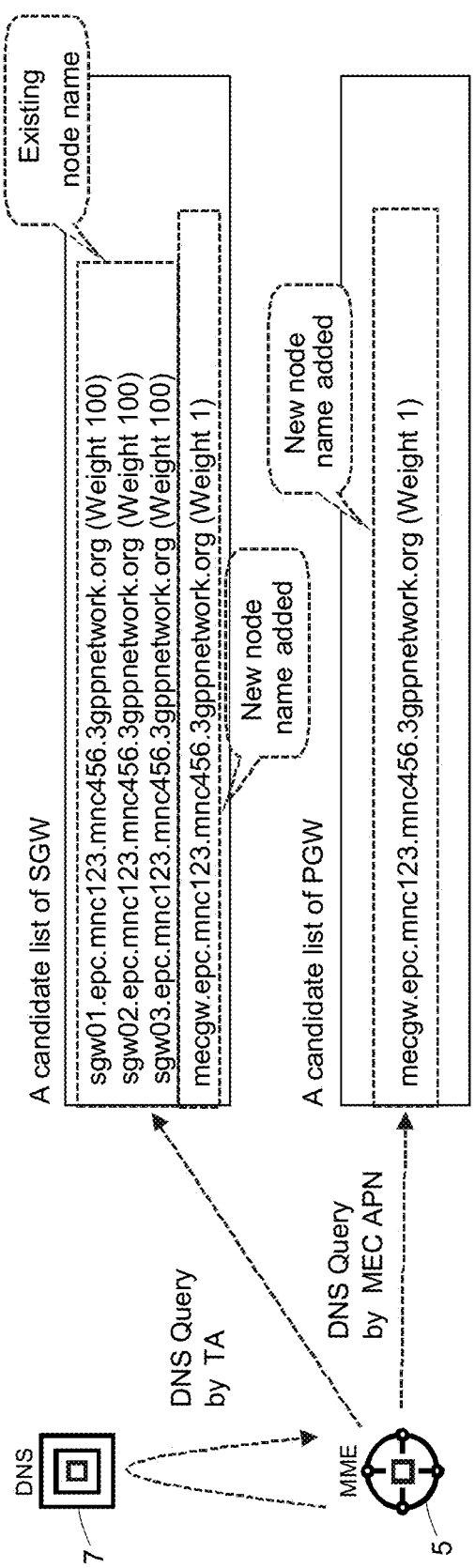
FIG. 6 illustrates example lists of SGW candidates and PGW candidates returned from a Domain Name System (DNS) in response to a query from an MME in accordance with one embodiment of the present disclosure.

FIG. 6 shows an exemplary list of SGW candidates and an exemplary list of PGW candidates returned from the DNS 7 in response to a query from the MME 5., in response to an attachment request from the MEC terminal 28, using the TA and the APN of the MEC terminal as keys. In FIG. 6, the upper three domain names in the candidate list of SGWs are domain names of existing SGW for non-MEC terminals, and the last domain name is the domain name of the server 20. The domain name of the server 20 also appears in the candidate list of PGWs shown in FIG. 6.

Figure 7:
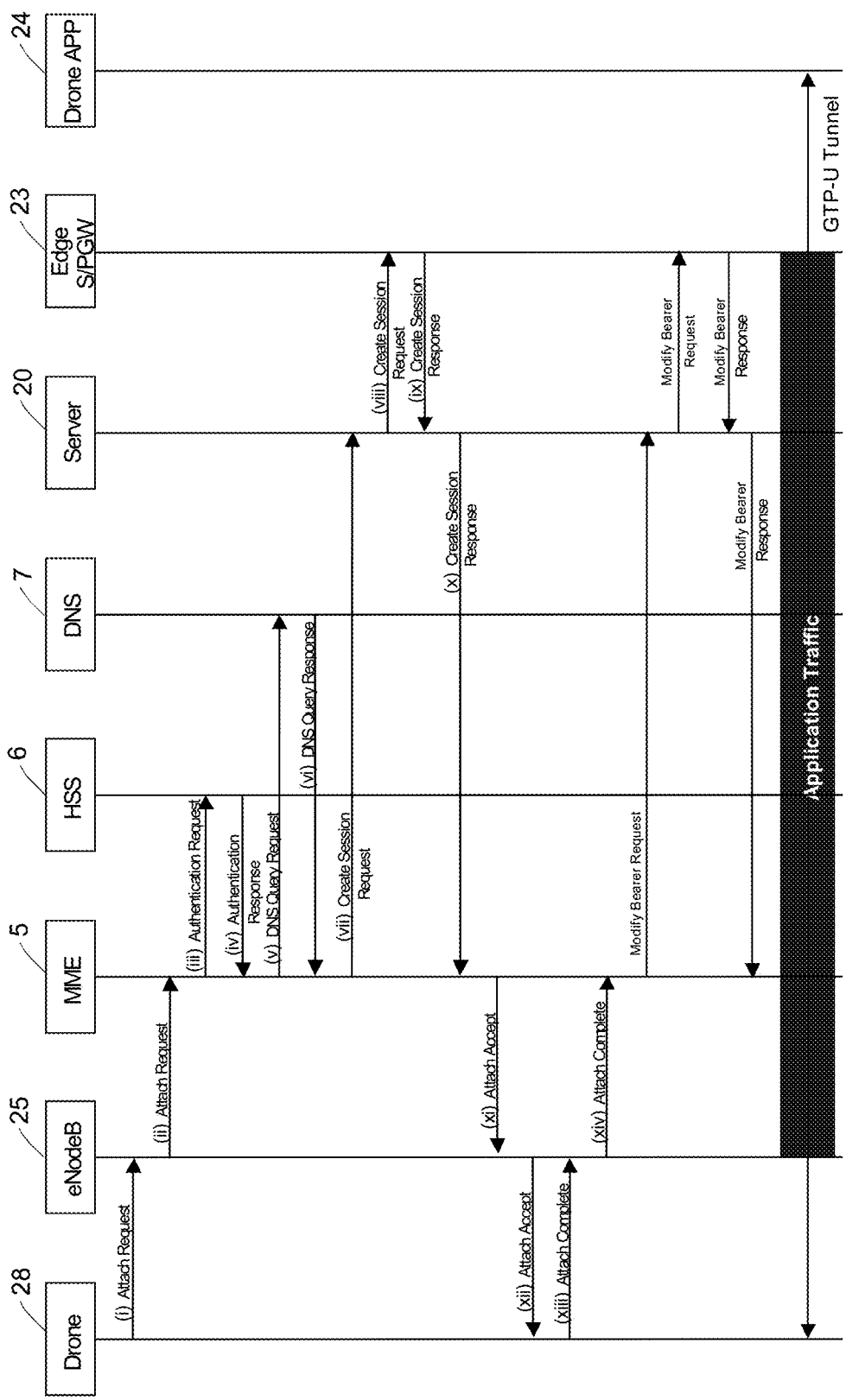
FIG. 7 is an example sequential diagram showing a communication procedure of initial messages for establishing a GPRS Tunneling Protocol for User Plane (GTP-U) session between a base station and an S/PGW in an edge site.

Reference is now made to FIG. 2 and FIG. 7 for explaining a flow of GTP messages that may take place when a GTP session is established between the eNodeB 25 and the S/PGW 23 in the edge site 21 in response to an Attach Request from the MEC terminal carried on the drone, i.e., the drone terminal 28. FIG. 7 is an example sequential diagram showing a communication procedure for establishing a GTP-U session between the base station, i.e., the eNodeB 25 which has received the Attach Request from the drone terminal 28, and the S/PGW 23 in the edge site 21.

With reference to FIG. 2, the drone terminal 28 may send an attachment request to the MME 5 through the eNodeB 25, and the MME 5 may communicate with the HSS 6 for authenticating and registering the location of the drone terminal 28, as in the case of the UE1 described above with reference to FIG. 1. More specifically, the drone terminal may issue an Attach Request to the eNodeB 25 (see (i) in FIG. 7), and the eNodeB 25 may forward the Attach Request to the MME 5 (see (i) in FIG. 2 and (ii) in FIG. 7). In response, the MME 5 may communicate with the HHS 6 and authenticate the drone terminal 28 (see (ii) in FIG. 2 and (iii) and (iv) in FIG. 6). The MME 5 may be operated to search for the same domain name from a list of PGW candidates and a list of PGW candidates and select a candidate having that domain name preferentially. The MME 5 may thus query the DNS 7 using the TA and the APN (mec.carrier-A.ne.jp) of the drone terminal and acquire the list of candidate SGWs corresponding to the TA and the list of candidate PGWs corresponding to the APN, with the latter list only shows the domain name of the server 20 (see FIG. 6).

As the domain name of the server 20 is inevitably included in the acquired list of candidate SGWs, the MME 5 may select the domain name of the server 20, i.e., a domain name common between the acquired candidate lists of SGWs and PGWs. The MME 5 may once again query the DNS 7 with the selected domain name, and acquire the IP address of the server 20 (see (iii) in FIG. 2 and (v) and (vi) in FIG. 7). An example domain name corresponding to the acquired IP address can be "mecgw.epc.mnc123.mnc456.3gppnetwork.org."

Thereafter, the MME 5 may set the IP address of IP packets for carrying a Create Session Request to the acquired IP address, i.e., the IP address of the server 20, and send out the IP packets (see (iv) in FIG. 2 and (vii) in FIG. 7).

The message transfer and control module 30 installed on the server 20 may receive the Create Session Request at the message receiver module 35, and pass it on to the message controller module 36.

The message controller module 36 may change the F-TEID field of the received Create Session Request, i.e., the C-Plane IP address of the S11 interface with the MME 5, to the IP address of the server 20, so that GPRS Tunneling Protocol for Control Plane (GTP-C) messages sent from the S/PGW 23 in the edge site 21 to the MME 5 can be received at the server.

The message controller module 36 may derive the IMSI of the MEC terminal 28, which may be a terminal information element such as 440207139204928 included in the received Create Session Request, as well as the identification number of the eNodeB 25 included in the Create Session Request, so as to acquire an individual APN "drone.apn" corresponding to the IMSI, with reference to the IMSI table 50 shown in FIG. 5A.

The message controller module 36 may refer to the MEC table 52 shown in FIG. 5B to acquire the identification information of an edge site corresponding to the acquired individual APN and the identification number of the eNodeB 25, i.e., a combination of drone.apn and eNodeB 25. The identification information of the edge site may be the IP address of the S/PGW 23 in the edge site 21.

The message controller module 36 may select the acquired IP address as the destination IP address of IP packets for carrying the received Create Session Request. The message transmitter module 37 of the message transfer and control module 30 may send out IP packets carrying the Create Session Request and having the IP address selected by the message controller module 36 as the destination IP address (see (v) in FIG. 2 and (viii) in FIG. 7).

In response to the reception of the Create Session Request, the S/PGW 23 in the edge site 21 may return a Create Session Response to the message transfer and control module 30 of the server 20 (see (vi) in FIG. 2 and (ix) in FIG. 7). The message receiver module 35 may receive the Create Session Response and pass it on to the message controller module 36.

The message controller module 36 may change the F-TEID field of the received Create Session Response, i.e., the C-Plane IP address of the interface S11 with SGW, to the IP address of the server 20, so as to receive GTP-C messages sent from the MME 5 to the S/PGW 23 at the server. The message transfer and control module 30 in the server 20 may transfer the Create Session Response to the MME 5 (see (x) in FIG. 7).

An Attach Accept from the MME 5 may be sent to the drone terminal 28 through the eNodeB 25 (see (xi) and (xii) in FIG. 7), and an Attach Complete issued from the drone 28 terminal may be forwarded to the MME 5 through the eNodeB 25 (see (xiii) and (xiv) in FIG. 7).

Next, the MME 5 may send a Modify Bearer Request to the S/PGW 23 for notifying the IP address of the eNodeB 25 in the U-Plane, and the S/PGW 23 may return a Modify Bearer Response to the MME 5. In this manner, a GTP-U session, which is a U-Plane GTP session, can be established between the eNodeB 25 and the S/PGW 23 of the edge site 21 (see (vii) in FIG. 2).

An example handover process using the GTP message transfer and control module of the present disclosure for implementing MEC in a mobile network will now be described with reference to FIGS. 8-10. The handover process may be performed differently depending on whether the message transfer and control module retains session information.

In one embodiment, for each GTP-C session, the aforementioned session information retainer (not shown) of the message transfer and control module 30 may retain a Terminal Endpoint Identifier (TEID) and information associated with the IP address of an S/PGW in an edge site. The TEID may be included in the F-TEID field of a Create Session Response sent from the S/PGW 23 to the server 20, as in the Create Session Response shown at (ix) in FIG. 7, in response to a Create Session Request sent from the MME 5 through the server 20 to the S/PGW 23, and identifies the S/PGW 23.

Figure 8:
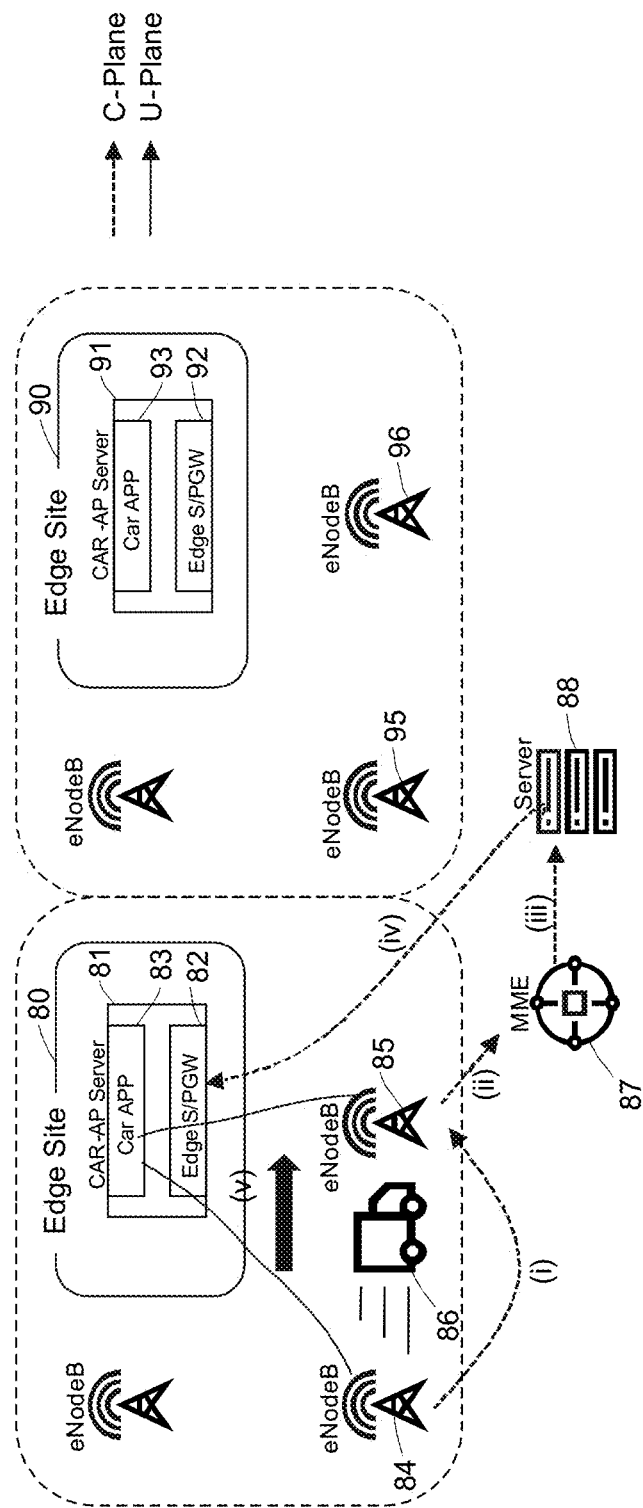
FIG. 8 is a diagram for describing an example handover procedure occurring between eNodeBs in an edge site in response to a wireless terminal moving from an area serviced by one base station to another.

With reference to FIG. 8, a MEC terminal carried on a car, which may be herein referred to as "car terminal" 86 and having an IMSI of 440207139204929 as shown in the IMSI table 50 of FIG. 5, may move from an area of coverage by an eNodeB 84 to an area of coverage by an eNodeB 85 (see (i) in FIG. 8). In the state shown in FIG. 8, a GTP session in the U-Plane is established between an S/PGW 82 included in an edge server 81 disposed in an edge site 80 and the car terminal 86. The edge server 81 may also include an application "Car APP" for the car terminal 86. The eNodeB 85 may transmit a Path Switch Request to an MME 87 to notify that the car terminal 86 has moved from the area of the eNodeB 84 to the area of the eNodeB 85 (see (ii) in FIG. 8). The MME 87 may transmit a Modify Bearer Request, including the IP address of the eNodeB 85, to a server 88 installed with a GTP message transfer and control module according to one embodiment of the present disclosure (see (iii) in FIG. 9).

Next, the server 88 may compare the session information retained in the session information retainer module and the TEID included in the GTP header of the received GTP message, i.e., Modify Bearer Request, and may determine the destination IP address of the Modify Bearer Request. In the illustrated example, the TEID included in the session information and matching the TEID in the Modify Bearer Request is associated with the IP address of the S/PGW 82 in the edge site 80. The server 88 may thus select the IP address of the S/PGW 82 in the edge site 80 as the destination IP address of the Modify Bearer Request.

As the Modify Bearer Request includes the IP address of the destination eNodeB 85, the server 88 may refer to the IMSI table 50 and the MEC table 52 as shown in FIG. 5 and determine that the destination eNodeB 85 of the car terminal 86 should be connected to the S/PGW 82 in the edge site 80. As the destination IP address selected for the Modify Bearer Request is the IP address of the S/PGW 82 in the edge site 80, the message transfer and control module 30 of the server 88 may determine that there should be no change of edge site this time.

The GTP message transfer and control module 30 of the server 88 may thus forward the Modify Bearer Request (see (iv) in FIG. 8). The GTP session of the S/PGW 82 established with the eNodeB 84 can be switched to a GTP session with the eNodeB 85 when the S/PGW 82 in the edge site 80 sends out an End Marker at the time of switching data communication by sending a Modify Bearer Response in response to the receipt of the Modify Bearer Request (see (v) in FIG. 8).

In one embodiment, the handover may occur between eNodeBs belonging to different edge sites. FIGS. 9 and 10 illustrate an example case where the car terminal 86 moves from the eNodeB 85 associated with the edge site 80 to an eNodeB 95 associated with an edge site 90 (see (i) in FIG. 9).

As in the case described in connection with FIG. 8, the eNodeB 85 may transmit a Path Switch Request to the MME 87 to notify the MME 87 that the car terminal 86 has moved from the area of the eNodeB 85 to the area of the eNodeB 95 (see (ii) in FIG. 9). In response, the MME 87 may transmit a Modify Bearer Request, including the IP address of the eNodeB 95, to the server 88 (see (iii) in FIG. 9).

Next, the server 88 may compare the session information retained in the session information retainer module and the TEID included in the GTP header of the received GTP message, i.e., Modify Bearer Request, and may determine the destination IP address of the Modify Bearer Request. In the illustrated example, the TEID included in the session information and matching the TEID in the Modify Bearer Request is associated with the IP address of the S/PGW 82 in the edge site 80. The server 88 may thus select the IP address of the S/PGW 82 in the edge site 80 as the destination IP address of the Modify Bearer Request.

As the Modify Bearer Request includes the IP address of the destination eNodeB 95, the server 88 may refer to the IMSI table 50 and the MEC table 52 as shown in FIG. 5 and determine that the destination eNodeB 95 of the car terminal 86 should be connected to an S/PGW 92 included in an edge server 91 disposed in the edge site 90. As the destination IP address selected for the Modify Bearer Request is the IP address of the S/PGW 82 in the edge site 80, the message transfer and control module 30 of the server 88 may determine that there should be a change of edge site this time (see (iv) in FIG. 9).

Figure 9:
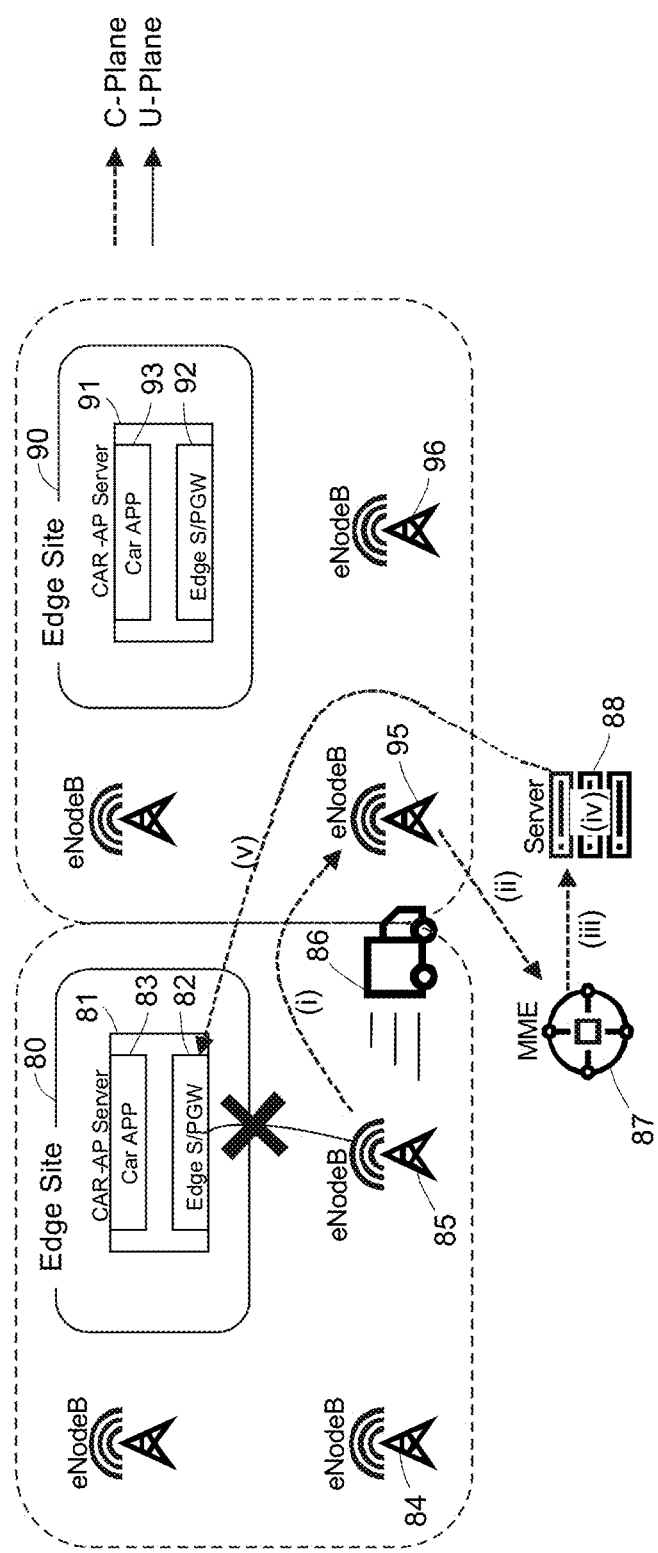
FIG. 9 is a diagram for describing an example handover procedure occurring between edge sites in response to the wireless terminal moving from an area serviced by one base station to an area covered by another base station located in a different area.

A message editor module (not shown) included in the message transfer and control module 30 may thus operate to include disconnect instruction information in the received Modify Bearer Request for instructing disconnection of the GTP session, and the server 88 may forward the Modify Bearer Request including such information to the S/PGW 82 in the edge site 80 (see (v) in FIG. 9).

In accordance with the disconnect instruction information included in the received Modify Bearer Request, the S/PGW 82 in the edge site 80 may operate to transmit, after sending a Modify Bearer Response to the MME 87 through the server 88, a Delete Bearer Request to the MME 87 through the server 88 so as to disconnect the GTP session with the eNodeB 85 (see the X symbol in FIG. 9). It will be understood that the S/PGW 82 in the edge site 80 may be readily configured to disconnect GTP sessions on the basis of such disconnect instruction information.

Figure 10:
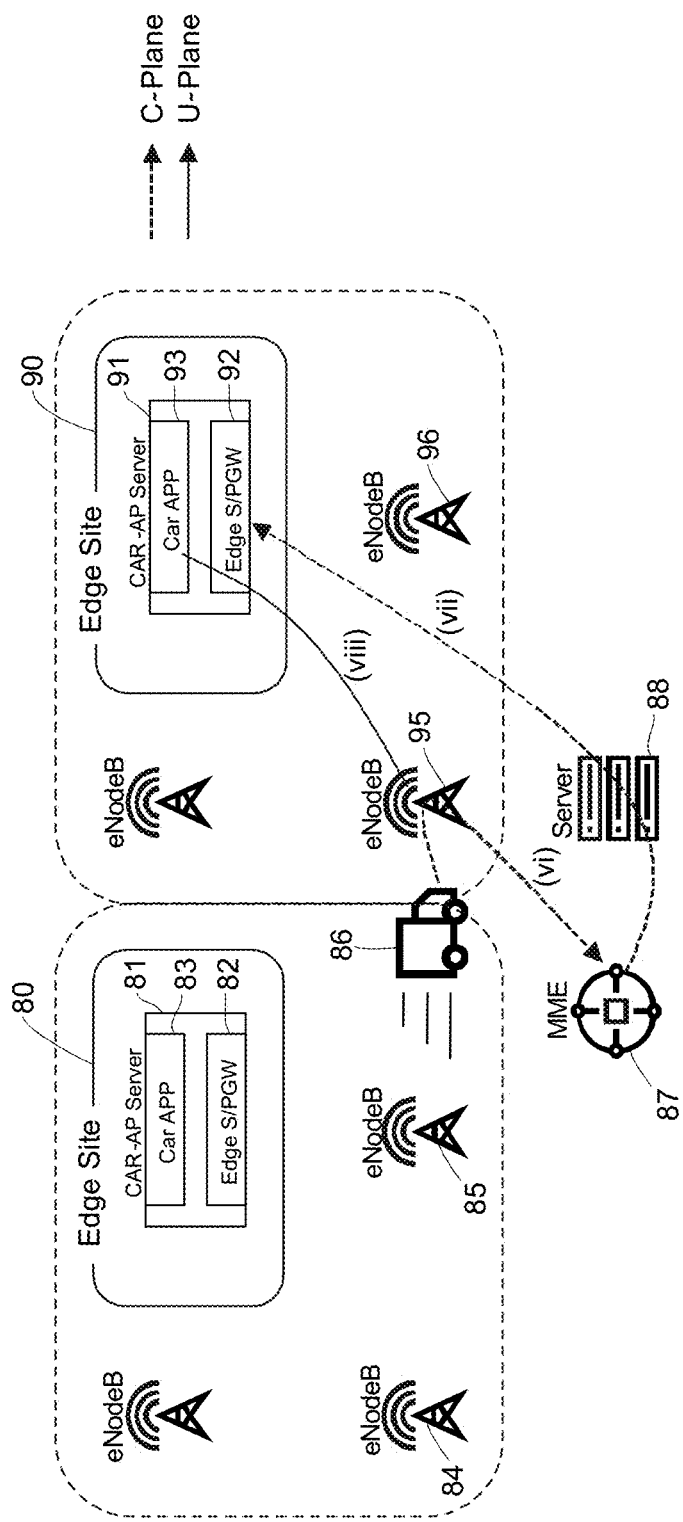
FIG. 10 is a diagram for describing an example handover procedure following the example handover procedure shown in FIG. 8, occurring between the edge sites in response to the wireless terminal moving from an area serviced by one base station to an area covered by another base station located in a different area.

The car terminal 86 may once again issue an Attach Request, and the eNodeB 95 may forward the Attach Request to the MME 87 (see (vi) in FIG. 10). The MME may transmit a Create Session Request to the server 88. The message transfer and control module 30 of the server 88 may retrieve the IMSI from the Request, acquire the individual APN of the car terminal 86 with reference to the IMSI table 50 as shown in FIG. 5A, as well as the MEC table 52 as shown in FIG. 5B, and learn that a combination of the acquired individual APN and the eNodeB 95 corresponds to the edge site 90.

The message transfer and control module 30 may thus select the S/PGW 92 in the edge site 90 as the destination for forwarding the Create Session Request, and forward the Request to that S/PGW 92 (see (vii) in FIG. 10). The S/PGW 92 may return a Create Session Response. Messages may be transmitted as described above in connection with (xi)-(xiv) shown in FIG. 7 for establishing a GTP session in U-Plane between the eNodeB 95 and the P/SGW 92 in the edge site 90 (see (viii) in FIG. 10). The car terminal may thereby be enabled to communicate with the edge server 91 which includes an application Car APP 93 in the edge site 90.

With reference to the example shown in FIG. 2, in one embodiment, the message receiver module 35 (FIG. 3) of the message transfer and control module 30 installed on the server 20 may receive one or more Ethernet frames containing IP packets carrying the Create Session Request from the first L3 switch 42, as illustrated in FIG. 4, and may pass the Create Session Request to the message controller module 36.

The message controller module 36 may derive the IMSI of the MEC terminal, the drone terminal 28, which may be a terminal information element such as 440207139204928 included in the Create Session Request, as well as the identification number of the eNodeB 25 included in the Create Session Request, so as to acquire an individual APN, "drone.apn" corresponding to the IMSI, with reference to the IMSI table 50 shown in FIG. 5A.

The message controller module 36 may refer to the MEC table 52 shown in FIG. 5B to acquire the identification information of an edge site corresponding to the acquired individual APN and the identification number of the eNodeB 25, i.e., a combination of drone.apn and eNodeB 25. The identification information of the edge site 21 may be the IP address of the S/PGW 23 in the edge site 21.

The message controller module 36 may select the acquired IP address as the destination IP address of IP packets for carrying a Create Session Request corresponding to, or copied from, the received Create Session Request. The message transmitter module 37 of the message transfer and control module 30 may send out IP packets carrying the Create Session Request and having the IP address selected by the message controller module 36 as the destination IP address (see (v) in FIG. 2 and (viii) in FIG. 7).

The S/PGW 23 in the edge site 21 may send out one or more IP packets carrying a Create Session Response, with the IP address in the F-TEID field: S11 SGW GTP-C being set to the IP address of the S/PGW 23. At that time, the source IP address of the IP packets carrying the Create Session Request received by the S/PGW 23 may be set in the destination IP address of the IP packets carrying the Create Session Response.

The second L3 switch 44 may receive the IP packets carrying the Create Session Response, set the destination MAC address of Ethernet frames containing the IP packets to the MAC address of the server, and forward them to the message transfer and control module 30 of the server 20, (see (vi) in FIG. 2 and (ix) in FIG. 7).

The message receiver module 35 of the message transfer and control module 30 installed on the server 20 may receive the Create Session Response carried by the IP packets contained in the Ethernet frames, and pass it on to the message controller module 36. The message transfer and control module 30 may transfer the Create Session Response as it is to the MME 5 (see (x) in FIG. 7).

An Attach Accept from the MME 5 may be sent to the drone terminal 28 through the eNodeB 25 (see (xi) and (xii) in FIG. 7), and an Attach Complete issued from the drone terminal 28 may be forwarded to the MME 5 through the eNodeB 25 (see (xiii) and (xiv) in FIG. 7).

The MME 5 may send a Modify Bearer Request to the S/PGW 23 for notifying the IP address of the eNodeB 25 in the U-Plane, and the S/PGW 23 may return a Modify Bearer Response to the MME 5. All of these messages may be routed through the server 20, and the server 20 may transport them simply in accordance with the IP routing, without making any changes. In this manner, a GTP-U session, which may be a U-Plane GTP session can be established between the eNodeB 25 and the S/PGW 23 in the edge site 21 (see (vii) in FIG. 2).

An example handover process using the GTP message transfer and control device of the present disclosure for implementing MEC in a mobile network will now be described. This example may use the routing configuration as shown in FIG. 4 in the MEC environment as shown and described above in previous FIGS. 8-10, but without retaining session information for processing handover.

Specifically, when the car terminal 86 moves from an area of coverage by the eNodeB 84, with which a GTP session in the U-Plane has been established with the S/PGW 82 in the edge site 80, to an area of coverage by the eNodeB 85 (see (i) in FIG. 8), the eNodeB 84 transmits a Path Switch Request to the MME 87 to notify the MME 87 that the car terminal 86 has moved from the area of the eNodeB 84 to the area of the eNodeB 85 (see (ii) in FIG. 8). In response, the MME 87 may transmit one or more IP packets carrying a Modify Bearer Request, including the IP address of the destination eNodeB 85.

As the destination IP address of the IP packets carrying the Modify Bearer Request matches the IP address of the S/PGW 82 in the edge site 80, with which the GTP session is currently being established with the source eNodeB 84, the first L3 switch 42, which has received the IP packets carrying the Modify Bearer Request, may be operated to route IP packets carrying the Modify Bearer Request to the server 88 (see (iii) in FIG. 8). The first L3 switch 42 may be configured to have such routing information.

The message controller module 36 learns from the destination IP address of the IP packets contained in the Ethernet frames received from the first L3 switch 42 and carrying the Modify Bearer Request that the S/PGW 82, in connection with which the GTP session is currently established with the source eNodeB 84, is located in the edge site 80.

Also, as the Modify Bearer Request may include the IP address of the destination eNodeB 85, the message controller module 36 may determine, with reference to the IMSI table 50 and the MEC table 52 as shown in FIG. 5, that the destination eNodeB 85 of the car terminal 86 should be connected to the S/PGW 82 in the edge site 80. As the destination IP address of the IP packets carrying the Modify Bearer Request may be the IP address of the S/PGW 82 in the edge site 80, it may be determined that there should be no change of edge site this time.

The GTP message transfer and control module 30 may thus forward the Modify Bearer Request without any changes (see (iv) in FIG. 8). The GTP session of the S/PGW 82 established with the eNodeB 84 can be switched to a GTP session with the eNodeB 85 when the S/PGW 82 in the edge site 80 sends out an End Marker at the time of switching data communication by sending a Modify Bearer Response in response to the receipt of the Modify Bearer Request (see (v) in FIG. 8).

Turning to the handover procedure illustrated in FIGS. 9 and 10, the server 88 also does not retain session information for processing handover. When the car terminal 86 has moved from the area of the eNodeB 85 to the area of the eNodeB 95 (see (i) in FIG. 9), the eNodeB 95 may transmit a Path Switch Request to the MME 87 for notifying that the car terminal 86 has moved to the area of the eNodeB 95 (see (ii) in FIG. 8).

In response, the MME 87 may transmit one or more Ethernet frames containing IP packets carrying a Modify Bearer Request, including the IP address of the target eNodeB 95. As the destination IP address of the IP packets carrying the Modify Bearer Request matches the IP address of the S/PGW 82 in the edge site 80, with which the GTP session is currently being established with the source eNodeB 85, the first L3 switch 42, which has received the IP packets carrying the Modify Bearer Request, may be operated to route IP packets carrying the Modify Bearer Request to the server 88 (see (iii) in FIG. 9).

The message controller module 36 learns from the destination IP address of the IP packets contained in the Ethernet frames received from the L3 switch 42 and carrying the Modify Bearer Request that the S/PGW 82, in connection with which the GTP session is currently established with the source eNodeB 85, is located in the edge site 80.

As the Modify Bearer Request may include the IP address of the destination eNodeB 95, the message controller module 36 may determine, with reference to the IMSI table 50 and the MEC table 52 as shown in FIG. 5, that the destination eNodeB 95 of the car terminal 86 should be connected to the S/PGW 92 in the edge site 90. As the destination IP address of the IP packets carrying the Modify Bearer Request may be the IP address of the S/PGW 82 in the edge site 80, it can be determined that there should be a change of edge site this time (see (iv) in FIG. 9).

A Modify Bearer Request including disconnect instruction information may be transported to the S/PGW 82 in the edge site 80 (see (v) in FIG. 9) for disconnecting the GTP session between the S/PGW 82 in the edge site 80 and the eNodeB 85. A GTP session in the U-Plane may be established between the eNodeB 95 and the S/PGW 92 in the edge site 90 (see (vi)-(viii) in FIG. 10), and the car terminal 86 may thereby be enabled to communicate with the edge server 91 in the edge site 90.

In the handover process using the GTP message transfer and control device of the present disclosure, the message transfer and control module 30 may determine, in accordance with the setting of the IMSI table 50 and the MEC table 52 as illustrated in FIG. 5, whether or not to switch the edge site at the time of handover, and to which edge site the switching should be made. Hence, an operator of the server can flexibly determine, as desired, whether or not the edge site should be switched at the occurrence of a handover and to which edge site the switching should be made.

In response to a change in a connected edge site caused by the movement of a MEC terminal, the edge server executing applications for the MEC terminal may also change. In the event of a transfer from a source edge site to a destination edge site, user data possessed by the source application, such as position information of an automobile, may be transferred to an application executable in the destination edge site so that the application can continue working in the destination edge site.

Figure 11:
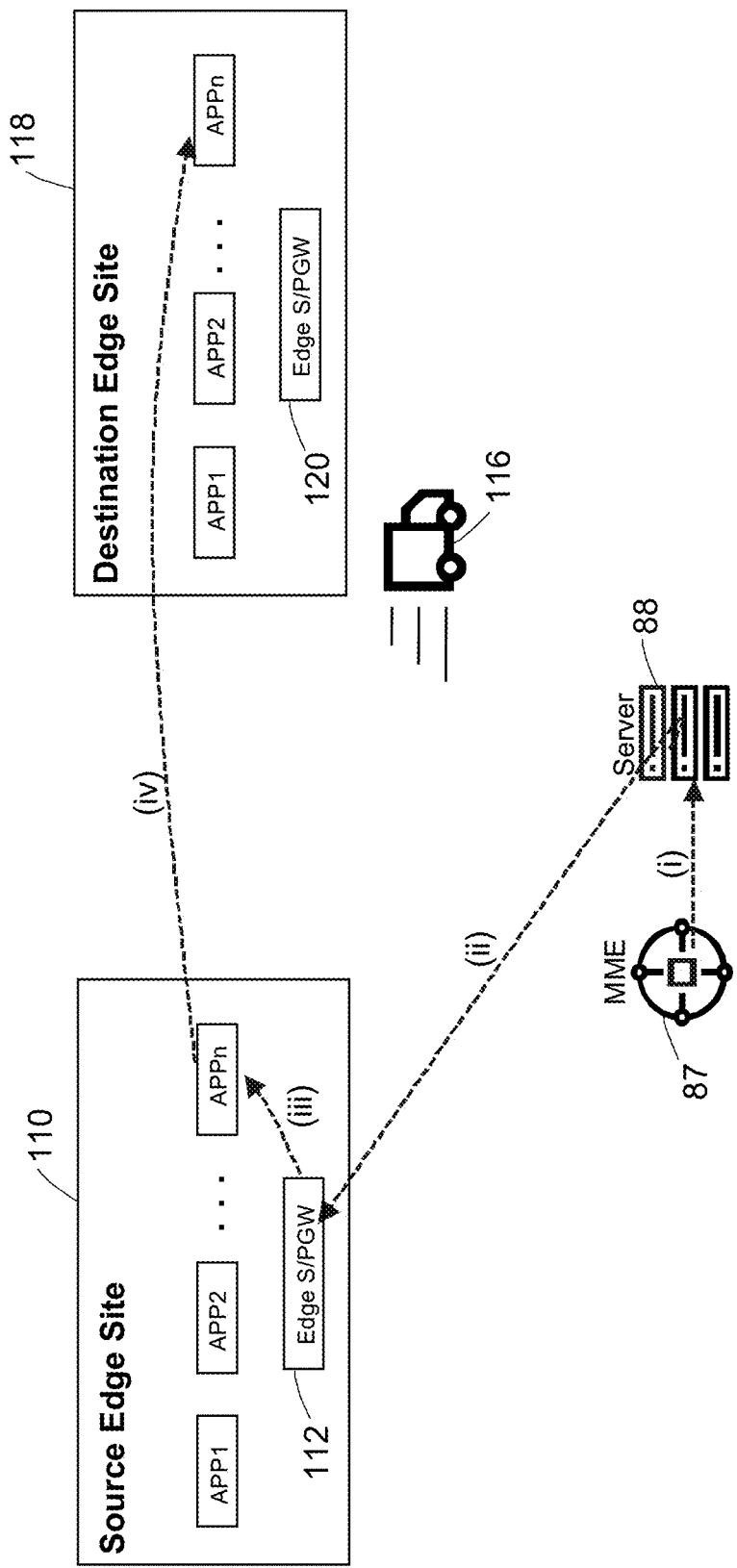
FIG. 11 is a diagram for describing an example procedure for transferring user data in accordance with one embodiment of the present disclosure, in response to an application connected to a wireless terminal changing from one edge site to another in the course of a handover.

FIG. 11 illustrates a method for transferring user data from one edge site to another in accordance with one embodiment of the present disclosure. Such transfer enables a continuous operation of application between a source edge site 110 and a destination edge site 118. The illustrated embodiment shows that the destination for connecting a MEC terminal (such as "car terminal") carried on a car 116 changes from the source edge site 110 to the destination edge site 118 as the car 116 moves, in accordance with the procedure described in connection with previous FIGS. 9-10.

As shown in FIG. 11, the source edge site 110 and the destination edge site 118 may each include a plurality of applications APP1, APP2, APPn, etc. that are common between the edge sites. The applications may be executable on edge servers 112 and 120 in the edge sites. The two applications APPn shown in FIG. 11 may signify the same automobile application that provide services mobile devices on the basis of their position information, and the application APPn in the source edge site 110 may retain user data, such as position data of the car 116 acquired through communication with the car terminal.

In response to car 116 moving to the destination edge site 118, the MEC terminal carried thereon may communicate with the application APPn in the destination edge site 118. However, as the application APPn in the destination edge site 118 does not have user data of the car 116 which was acquired by the source application APPn through communication with the car terminal, the application APPn in the destination edge site 118 is unable to continue processing without the user data.

The message transfer and control module 30 may be operated to send a Modify Bearer Request to the source edge site for switching edge site, as in the Modify Bearer Request transmitted from the server 88 to the edge site 80 as at (v) in FIG. 9. According to the present disclosure, the message editor module (not shown) included in the message transfer and control module 30 may be operated to include in the Modify Bearer Request, in addition to the information for disconnecting GTP session ("disconnect instruction information"), information indicating that the MEC terminal should be connected to applications in the destination edge site ("application transition information").

A Modify Bearer Request may be sent from the MME 87 to the S/PGW 112 in the source edge site 110 through the server 88 for switching edge site (see (i) and (ii) in FIG. 11). The S/PGW 112 may receive the Modify Bearer Request and disconnects the GTP session with the eNodeB 85 by following the disconnect instruction information included in the received Modify Bearer Request. The application transition information may be relayed to the application APPn in the source edge site 110 (see (iii) in FIG. 11). The application APPn in the source edge site 110 transfers the user data of the car 116 retained by the application APPn to the application APPn in the destination edge site 118 (see (iv) in FIG. 11). It may be apparent that the S/PGWs and the applications in the edge sites are readily configured to operate in the described manner. The application transition information can be an address of an edge server on which the application APPn is installed in the destination edge site 118.

The application APPn in the destination edge site 118 may thus be enabled to continue processing by utilizing the user data of the car 116 previously retained by the application APPn in the source edge site. The same procedure may be applicable to a combination of other types of MEC terminals, such as a drone, and other types of applications.

In the foregoing, the method and apparatus of the present disclosure are described for use in the 4G LTE network environment, but it will be understood that the present disclosure may equally be applicable to the 3G network and the 5G network environments. For example, the Serving GPRS Support Node (SGSN), Gateway GPRS Support Node (GGSN) and Home Location Resister (HLR) in the 3G and/or 5G network environment may correspond to the SGW, PGW and HSS. Additionally, the Create PDP Context Request and Create PDP Context Response messages in the 3G and/or 5G network environment may correspond to the aforementioned Create Session Request and Create Session Response messages.

What is claimed is:

1. A method comprising:
   in response to receipt by a first base station of an attach request from a wireless terminal associated with terminal-related information, receiving, by a server, a session establishing request from a network management device (MME);
   acquiring, by the server, a list of serving and packet data network gateway (S/PGW) candidates;
   selecting, by the server, a serving and packet data network gateway (S/PGW) located at an edge site from the list of serving and packet data network gateway (S/PGW) candidates based on the terminal-related information and base station information included in the session establishing request;
   editing, by the server, the session establishing request to include a designation of the serving and packet data network gateway (S/PGW), wherein the session establishing request is edited at a Fully Qualified Tunnel End Point Identifier (F-TEID) field to include the designation of the serving and packet data network gateway (S/PGW);
   in response to transferring the edited request to the serving and packet data network gateway (S/PGW), receiving, by the server, a response from the serving and packet data network gateway (S/PGW), wherein an internet protocol (IP) address of an interface with the serving and packet data network gateway (S/PGW) is set in the F-TEID field; and
   transferring, by the server, the response to the network management device (MME) such that the response establishes a General Packet Radio Service (GTP) session between the first base station and the serving and packet data network gateway (S/PGW).

2. The method of claim 1 wherein selecting the serving and packet data network gateway (S/PGW) located in the edge site comprises:
   referencing a first table that defines a relationship between terminal-related information of the wireless terminal and Access Point Names (APNs); and
   referencing a second table that defines a relationship between the APNs, base station information, and edge site information.

3. The method of claim 2 comprising:
   acquiring, from the first table, an APN that corresponds to the terminal-related information of the wireless terminal;
   searching, in the second table, a combination of the acquired APN and the base station information; and
   acquiring edge site information that corresponds to the combination.

4. The method of claim 1 comprising:
   retaining session information of the GTP session;
   in response to the wireless terminal moving to an area covered by a second base station, receiving a modify bearer request including identification information of the second base station;
   specifying a second gateway in a destination edge site from the session information and the modify bearer request;
   in response to a determination that the destination edge site is different from the edge site including the serving and packet data network gateway (S/PGW), editing the modify bearer request to include information instructing disconnection of the GTP session; and
   sending the edited modify bearer request to the serving and packet data network gateway (S/PGW).

5. The method of claim 1 comprising:
   receiving, from a Layer 3 (L3) switch located at a previous hop, an Internet Protocol (IP) packet that carries a modify bearer request that identifies a second base station in response to the wireless terminal moving to an area covered by the second base station;
   specifying a second gateway in a destination edge site from the destination IP address of the IP packet;
   in response to a determination that the destination edge site is different from the edge site including the serving and packet data network gateway (S/PGW), editing the modify bearer request to disconnect the GTP session; and
   sending the edited modify bearer request to the serving and packet data network gateway (S/PGW).

6. The method of claim 5 wherein each edge site includes an application, communicable with the wireless terminal through the GTP session, and executable on an edge server, and wherein the edited request includes information that indicates the application running on the edge server is changed to the same application in the destination edge site.

7. The method of claim 1 wherein the terminal-related information includes at least one of: a Mobile Subscriber ISDN Number (MSISDN), an International Mobile Subscriber Identity (IMSI), or an International Mobile Equipment Identity (IMEI).

8. The method of claim 1 wherein the wireless terminal is a wireless terminal mounted on a mobile device.

9. The method of claim 1, wherein the server is located between the network management device (MME) and the serving and packet data network gateway (S/PGW).

10. An apparatus comprising:
a receiver that, in response to receipt by a first base station of an attach request from a wireless terminal, receives a session establishing request from a network management device (MME);
a controller that:
acquires a list of serving and packet data network gateway (S/PGW) candidates;
selects a serving and packet data network gateway (S/PGW) located within an edge site from the list of serving and packet data network gateway (S/PGW) candidates based on the session establishing request; and
edits the session establishing request to include information designating the serving and packet data network gateway (S/PGW), wherein the session establishing request is edited at a Fully Qualified Tunnel End Point Identifier (F-TEID) field to include the information designating the serving and packet data network gateway (S/PGW);
a transmitter that transmits the edited session establishing request to the serving and packet data network gateway (S/PGW);
the receiver that receives a response from the serving and packet data network gateway (S/PGW), wherein an internet protocol (IP) address of an interface with the serving and packet data network gateway (S/PGW) is set in the F-TEID field; and
the transmitter that transmits the received session establishing response for establishing a General Packet Radio Service (GPRS) Tunneling Protocol (GTP) session between the first base station and the serving and packet data network gateway (S/PGW).

11. The apparatus of claim 10 wherein the controller comprises:
a first table that defines a relationship between terminal related information of the wireless terminal and Access Point Names (APNs), and
a second table that defines a relationship between the APNs, base station information and edge site information.

12. The apparatus of claim 11 wherein the controller references to the first table to acquire an APN corresponding to the terminal related information of the wireless terminal, and references to the second table to search a combination of the acquired APN and the base station information included in the session establishing request corresponding to the APN, and acquires edge site information corresponding to the combination.

13. The apparatus of claim 10 wherein:
the controller retains session information of the GTP session;
the receiver receives, in response to the wireless terminal moving to an area serviced by a second base station, a modify bearer request including identification information of the second base station;
the controller specifies a second gateway in a destination edge site from the session information and the modify bearer request;
in response to a determination that the destination edge site is different from the edge site including the serving and packet data network gateway (S/PGW), edits the modify bearer request to provide a disconnection of the GTP session; and
the transmitter sends the edited modify bearer request to the serving and packet data network gateway (S/PGW).

14. The apparatus of claim 12 wherein each edge site includes an application, executable on an edge server, and communicable with the wireless terminal through the GTP session, and the controller edits the modify bearer request to include information indicating that the application running on the edge server is changed to the same application in the destination edge site.

15. The apparatus of claim 10 wherein the session establishing request includes terminal-related information of the wireless terminal including at least one of: a Mobile Subscriber ISDN Number (MSISDN), an International Mobile Subscriber Identity (IMSI), or an International Mobile Equipment Identity (IMEI).

16. The apparatus of claim 10 wherein the wireless terminal is a wireless terminal mounted on a mobile device.

17. A non-transitory machine-readable storage medium encoded with instructions executable by a processor, that when executed causes a computing device to:
receive a session establishing request in response to receipt by a first base station of an attach request from a wireless terminal;
acquire a list of serving and packet data network gateway (S/PGW) candidates;
select a serving and packet data network gateway (S/PGW) located at an edge site from the list of serving and packet data network gateway (S/PGW) candidates based on the received session establishing request;
edit the session establishing request to include a designation of the serving and packet data network gateway (S/PGW), wherein the session establishing request is edited at a Fully Qualified Tunnel End Point Identifier (F-TEID) field to include the designation of the serving and packet data network gateway (S/PGW);
transfer the edited session establishing request to the serving and packet data network gateway (S/PGW), wherein an internet protocol (IP) address of an interface with the serving and packet data network gateway (S/PGW) is set in the F-TEID field;
receive a session establishing response from the serving and packet data network gateway (S/PGW); and
transfer the received session establishing response for establishing a GTP session between the first base station and the serving and packet data network gateway (S/PGW).

18. The non-transitory machine-readable storage medium comprising the instructions of claim 17, wherein the instructions to select the serving and packet data network gateway (S/PGW), when executed by the processor, causes the computing device to:
acquire, from a first table that defines relationships between wireless terminals and Access Point Names (APNs), an APN corresponding to terminal-related information of the wireless terminal;
search, in a second table, a combination of the acquired APN and the base station information; and
acquire edge site information corresponding to the combination.

19. The non-transitory machine-readable storage medium comprising the instructions of claim 17 and includes instructions executable by the processor that causes the computing device to:
    retain session information of the GTP session;
    receive a modify bearer request including identification information of a second base station, in response to the wireless terminal moving to an area services by a second base station;
    specify a second gateway in a destination edge site from the session information and the modify bearer request;
    in response to a determination that the destination edge site is different from the edge site including the serving and packet data network gateway (S/PGW), edit the modify bearer request to provide a disconnection of the GTP session; and
    send the edited modify bearer request to the serving and packet data network gateway (S/PGW).

20. The non-transitory machine-readable storage medium of claim 17 wherein the session establishing request includes terminal-related information including at least one of: a Mobile Subscriber ISDN Number (MSISDN), an International Mobile Subscriber Identity (IMSI), or an International Mobile Equipment Identity (IMEI).

21. The non-transitory machine-readable storage medium of claim 17 wherein the wireless terminal is a wireless terminal mounted on a mobile device.

\* \* \* \* \*